(12) United States Patent
Armstrong

(10) Patent No.: US 8,045,752 B2
(45) Date of Patent: Oct. 25, 2011

(54) SYSTEMS AND METHODS FOR WITNESS CARD ANALYSIS

(75) Inventor: Wayne Thomas Armstrong, Placitas, NM (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 998 days.

(21) Appl. No.: 11/948,182

(22) Filed: Nov. 30, 2007

(65) Prior Publication Data
US 2009/0141928 A1 Jun. 4, 2009

(51) Int. Cl.
G06K 9/00 (2006.01)
(52) U.S. Cl. ......... 382/100; 382/141; 382/103; 366/132
(58) Field of Classification Search .................. None
See application file for complete search history.

(56) References Cited

U.S. PATENT DOCUMENTS

| | | | |
|---|---|---|---|
| 5,113,454 A | 5/1992 | Marcantonio et al. | |
| 5,466,490 A * | 11/1995 | Glancy et al. | 427/422 |
| 5,509,959 A * | 4/1996 | Nielsen et al. | 106/287.35 |
| 5,899,959 A | 5/1999 | Shields et al. | |
| 6,072,890 A * | 6/2000 | Savard et al. | 382/110 |
| 6,266,437 B1 * | 7/2001 | Eichel et al. | 382/149 |
| 6,313,199 B1 * | 11/2001 | Davies et al. | 523/342 |
| 6,399,270 B1 * | 6/2002 | Mori et al. | 430/270.1 |
| 6,461,626 B1 | 10/2002 | Rabe et al. | |
| 6,950,547 B2 * | 9/2005 | Floeder et al. | 382/143 |
| 7,006,669 B1 | 2/2006 | Lavagnino et al. | |
| 7,277,570 B2 | 10/2007 | Armstrong | |
| 2004/0206676 A1 | 10/2004 | Dai et al. | |

FOREIGN PATENT DOCUMENTS
GB 2219168 A 11/1989

OTHER PUBLICATIONS

Sanderson et al., "Droplet Size Spectra of Dipel Sprayed Through Different Atomizers", Proceedings of the Symposium of Pesticide Formulations and Application Systems, XP009041323, pp. 256-264.
Salyani et al., "Performance of Image Analysis for Assessment of Simulated Spray Droplet Distribution", XP009041388, pp. 1083-1089.
Franz et al., "Aerial Spray Deposit Relations with Plant Canopy and Weather Parameters", Transactions of the ASAE, 1998, vol. 41(4), pp. 959-966.
Derksen et al., "Automated Detection of Fluorescent Spray Deposits with a Computer Vision System", Transactions of the ASAE, 1995, vol. 38(6), pp. 1647-1653.
Hurtig et al., "A New Technique for Sampling and Assessing Aerial Spray Deposits", Canadian Journal of Agricultural Science, vol. 36, Mar.-Apr. 1956, pp. 81-94.

* cited by examiner

*Primary Examiner* — Vikkram Bali
*Assistant Examiner* — Nancy Bitar
(74) *Attorney, Agent, or Firm* — Edell, Shapiro & Finnan, LLC

(57) ABSTRACT

A system for and method of assessing fluid spray using image processing techniques of a calibration and one or more as-sprayed witness cards. Calibration and as-sprayed witness cards are exposed to a backlight sufficient to make a plurality of stains thereon electronically visible. At the same time an image of the stains is captured by, e.g., a digital camera. Resulting image data is processed to assess characteristics of the stains of the fluid on the as-sprayed witness card(s) and thereby assess characteristics of the spray, e.g., volume of fluid delivered. In one embodiment, the witness card is a chemically coated semiopaque plate.

23 Claims, 5 Drawing Sheets

SYSTEMS AND METHODS FOR WITNESS CARD ANALYSIS

GOVERNMENT INTERESTS

Figure 1:
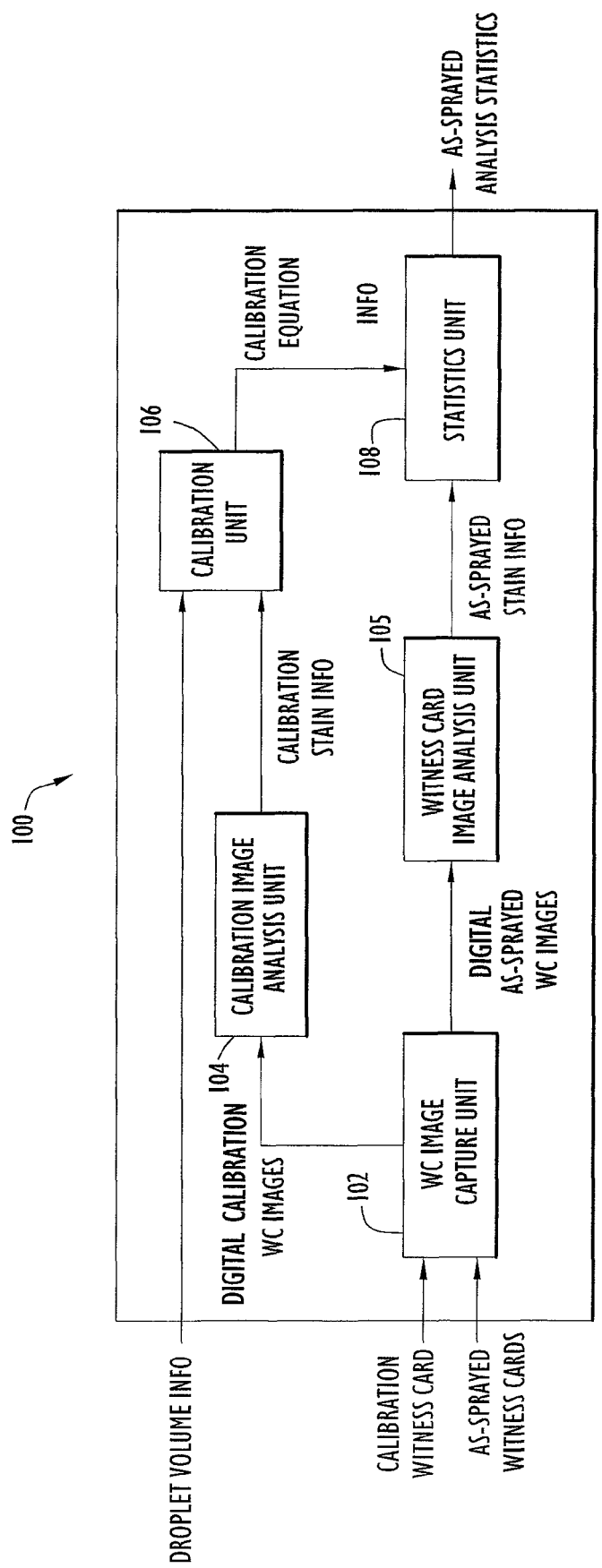

This invention was made with Government support and the Government may have certain rights in the invention.

FIELD OF THE INVENTION

The present invention is related to performance analysis of instrument controlled spraying. In particular, the present invention pertains to the use of backlit semiopaque witness cards to determine sprayed drop statistics.

BACKGROUND OF THE INVENTION

U.S. Pat. No. 7,277,570, which is incorporated herein by reference, describes image processing techniques to determine as-sprayed drop statistics for sprayed witness cards (WCs). As described therein, a wide variety of manufacturing and agricultural processes rely upon the use of instrument controlled spraying. For example, farmers and foresters typically use aircraft and/or farm equipment equipped with instrument sprayers to apply fertilizers and pesticides. Manufacturers use spray techniques to apply coatings and/or layers of a prescribed density/thickness.

In the case of farming and forestry, the spraying process preferably results in a prescribed amount of fertilizer or pesticide being distributed uniformly to the ground, crop or trees. A spray that distributes too little fluid to a target area may reduce the effectiveness of the fertilizer or pesticide treatment, resulting in lost crops/trees and/or reduced yield. A spray that distributes too much fluid to a target area typically increases the cost of applying the treatment and may result in additional losses due to undesired side effects and/or pollution. A spray that distributes fluid to a target area unevenly, typically results in some portions of the sprayed area receiving too little treatment and other portions of the area receiving too much treatment, resulting in both types of losses described above.

Manufacturing environments, such as automobile production plant paint shops, plywood manufacturers, coated glass manufacturing, and other processing facilities typically use sprays to apply paint, adhesives, cleaning solutions, etc., at various steps in production processes. The ability to deliver a precise distribution of a sprayed solution in a specified period of time allows such plants to conserve resources, to reduce waste, and to optimize a production line for consistent production.

In recent years, the ability to quantify the effectiveness of military and homeland security detection equipment designed to detect pollutants, toxic chemicals and/or biological agents within an environment has further increased the need for a fast and effective determination of spray characteristics as applied to a target area. For example, Raman spectroscopy may now be used to scan an operational environment to detect trace amounts of unknown or suspect substances. In order to perform operational testing of such a system, the precise nature of a sprayed distribution within the target area of a test must be precisely known.

The performance instruments used to dispense a fluid in the form of a mist, or spray, is typically quantified in terms of volume per unit time. This, plus sprayer motion, results in a desired spray density and a mass median diameter (MMD) of droplets deposited upon a sprayed target. Spray density quantifies the total mass of all droplets deposited within a predetermined area. Mass median diameter is the diameter for which one-half of the mass sprayed upon a target is contributed by particles smaller than the MMD and one-half of the sprayed mass is contributed by particles larger than the MMD. For example, if 1001 mg of solution is sprayed upon a target, the mass median diameter is the particle size such that 505.5 mg are contributed by particles smaller than the MMD and 505.5 mg are contributed by particles larger than the MMD. Assuming that each droplet is substantially spherical, measures of spray density and MMD provide a measure of the coverage achieved with the spray.

Currently, there is no reliable mechanism for setting an instrument controlled spraying device to deliver a pre-set range of drop sizes with a pre-set quantity of chemical in order to meet prerequisite density and MMD parameters on a target area. Absent the precision in spraying, 1) droplets may be too small, resulting in spray drift and low spray density and poor coverage, and 2) droplets may be too large resulting in the same low spray density, and poor coverage. Further, the same control setting upon a spray device may result in a different as-sprayed result upon a target area due to a variety of external factors such as the temperature of the fluid being sprayed, the viscosity of the fluid at the current temperature, the distance of a target from the spray jet, the presence/absence of wind, high/low humidity, high/low ambient temperatures, and/or other factors which can cause portions of a spray to drift off and/or portions of the spray to evaporate prior to reaching a target.

The inability to control such spray characteristics via a spraying device, especially with respect to agricultural, forestry and military test operations, in which fluids are typically sprayed from aircraft and/or ground vehicles operating in relatively uncontrolled environments, requires that a spray's characteristics be sampled/monitored within a sprayed area in order to determine the spray characteristics achieved by a specific sprayed application. Such sampling/monitoring is also helpful in controlled environments such as production lines to periodically ascertain the as-is characteristics of an applied spray. In addition to the above, it is also an objective of the U.S. Department of Defense to evaluate military chemical detection systems by subjecting these systems to simulated field conditions where the spraying condition might, e.g., emulate the explosion of ordinance containing chemical warfare agents. Meeting these unusual conditions requires that the as-sprayed characteristics be sampled/monitored within a sprayed area in order to determine the spray characteristics.

Typically, such monitoring is performed by laying down paper or cardboard cards, commonly referred to as witness cards (WCs), at one or more locations within an area to which a spray is to be applied. The witness cards absorb the sprayed drops resulting in a fixed pattern of stains of varying sizes deposited on the cards. Thus, each card captures a representative sample of the spray at a location within the sprayed area. Once stained, a witness card is analyzed and the stain pattern is translated into a characterization of the spray in terms of spray density, MMD and other statistical parameters.

Unfortunately, conventional techniques for processing witness cards are quite limited. For example, one technique is to assess the droplet stains found within a plurality of portions of a given witness card, and found within a plurality of witness cards. A single witness card is typically sampled until a maximum of 15 portions/samples are processed or until information on 100 droplets is collected. Information related to the droplet stains is used to characterize the spray at the location of the witness card. By collecting information related to multiple witness cards distributed over an area subjected to a spraying operation, statistics related to the overall spraying are generated. U.S. Pat. No. 7,277,570 describes a more automated methodology for analyzing as-spayed witness cards that relies on electronic imagery and calibration techniques.

Notably, however, prior art witness card test spray methodologies require that the substance being sprayed be dyed so that droplets that stain the witness cards can be more easily seen or detected. However, dying a substance or liquid to be sprayed adds unnecessary expense in terms of both time and materials, may change the characteristics of the substance being sprayed, may adversely affect the performance of a given chemical detection system under test, or may cause different spray characteristics for different batches of the dyed liquid. For example, the U.S. Government has approved several "simulants" for use in spray tests. A simulant is a substance (e.g., a liquid or fluid) that may be used in place of another liquid, which may be too expensive or hazardous to use merely for testing purposes. By dyeing a simulant, the characteristics of the simulant may change, thereby further distancing a test spray from spray characteristics of a substance for which the simulant is being used.

Accordingly, there remains a need to provide improved witness card analysis techniques, especially where simulants are not dyed.

SUMMARY OF THE INVENTION

In accordance with the present invention, there is provided a witness card analysis method that begins by selecting a fluid to be sprayed and positioning a witness card in an area to be sprayed. The fluid is then sprayed such that drops of the fluid contact the witness card resulting in an as-sprayed witness card with a pattern of stains of the fluid. To capture an image of the stains for further processing, the as-sprayed witness card is exposed to a backlight sufficient to make the pattern of stains visible. For example, the fluid that is sprayed may be a clear, un-dyed, liquid and thus difficult or impossible to see. However, the backlight enables the droplet stains to be sufficiently visible such that, e.g., a digital camera can capture an image of the stains. The resulting image is then processed to determine characteristics of the drops of the fluid on the as-sprayed witness card. Processing may include comparison of the as-sprayed stains to stains on a calibration witness card that were previously processed.

In one embodiment, the witness card is semiopaque and may include a coating, which may react with the fluid that is sprayed.

These and other features of embodiments of the present invention and their attendant advantages will be more fully appreciated upon a reading for the following detailed description in conjunction with the associated drawings.

BRIEF DESCRIPTION OF THE DRAWINGS

FIG. 1 is a block diagram of a spray performance analysis system in accordance with an exemplary embodiment of the present invention.

FIGS. 2A and 2B are schematic diagrams of stand-alone and networked computer environments, respectively, capable of supporting a spray performance analysis system in accordance with an exemplary embodiment of the present invention.

FIG. 3 is a process flow diagram depicting the development of calibration equations used to calibrate a spray performance analysis system in accordance with an exemplary embodiment of the present invention.

FIG. 4 is a process flow diagram depicting use of the spray performance analysis system of FIG. 1 to generate as-sprayed performance statistics in accordance with an exemplary embodiment of the present invention.

FIG. 5 is an embodiment of a witness card that may be used in connection with an embodiment of the present invention.

FIG. 6 is an image enhancing apparatus that may be used in connection with capturing witness card image data in accordance with embodiments of the present invention.

DETAILED DESCRIPTION

FIG. 1 is a block diagram of a spray performance analysis system 100 in accordance with an exemplary embodiment of the present invention. As shown in FIG. 1, analysis system 100 includes a WC image capture unit 102, a calibration image analysis unit 104, a WC image analysis unit 105, a calibration unit 106 and a statistics unit 108. WC image capture unit 102 captures witness card images that are submitted to either unit 104 or unit 105 depending on the type of image being processed. WC images of calibration witness cards are submitted to unit 104. WC images of as-sprayed witness cards are submitted to unit 105. The image analysis units 104 and 105 preferably include the same core image preprocessing control parameters, but are configured to perform different functions. The calibration image analysis unit 104 generates stain area information from calibrated drops of one or several stains as directed by the user. The WC image analysis unit 105 automatically identifies as many as all of the stains within a witness card image and may determine stain areas for each identified stain and physical attributes of the stain image space. Calibration unit 106, receives calibration witness card stain dimension data from calibration image analysis unit 104 and known droplet volume information to generate a calibration curve equation, or set of linear and/or non-linear equations, capable of accurately estimating a droplet dimension (e.g., droplet diameter or MMD) as a function of a determined stain dimension (e.g., stain diameter) for an identified fluid at an identified temperature upon an identified paper stock. Statistics unit 108 receives and stores one or more calibration equations generated by calibration unit 106.

Upon receiving as-sprayed witness card stain dimension data from WC image analysis unit 105, statistics unit 108 may select a stored calibration equation, or set of equations, based upon the fluid, fluid temperature and type of witness card used to produce the as-sprayed stains. Statistics unit 108 then uses the selected calibration equation (s) to estimate spray droplet diameters (i.e., MMD values) and spray density for each as-sprayed witness card. In addition, based upon the number of droplets, spray density, and MMD values determined for each as-sprayed witness card retrieved from a known location within a sprayed target area, statistics unit 108 is capable of generating statistical data that characterizes spray performance within any or all portions of the sprayed target area.

FIG. 2A depicts an exemplary embodiment of the present invention in which a spray performance analysis system 200 is implemented in a stand-alone configuration. As shown in FIG. 2A, such an embodiment may include a scanner 202 (or more generally, a WC image capture unit 102 including a digital camera 640 as will be discussed more fully in connection with FIG. 6), and a conventional computer processing unit 204 with conventional user input/output devices such as a display 206, keyboard 208 and mouse 210. The computer system may use any of the major platforms such as Windows, Linux, Macintosh, Unix or OS2. Further, computer processing unit 204 includes components (e.g. processor, disk storage or hard drive, etc.) having sufficient processing and storage capabilities to effectively execute spray performance analysis system processes. In such an embodiment, a user interfaces with the spray performance analysis system executing upon computer processing unit 204 via a command line or graphical user interface to process witness cards in accordance with the present invention. WC image capturing, image analysis, generation of calibration equations, and the generation of as-sprayed statistics may, accordingly, be performed from a single location.

Figure 2A:
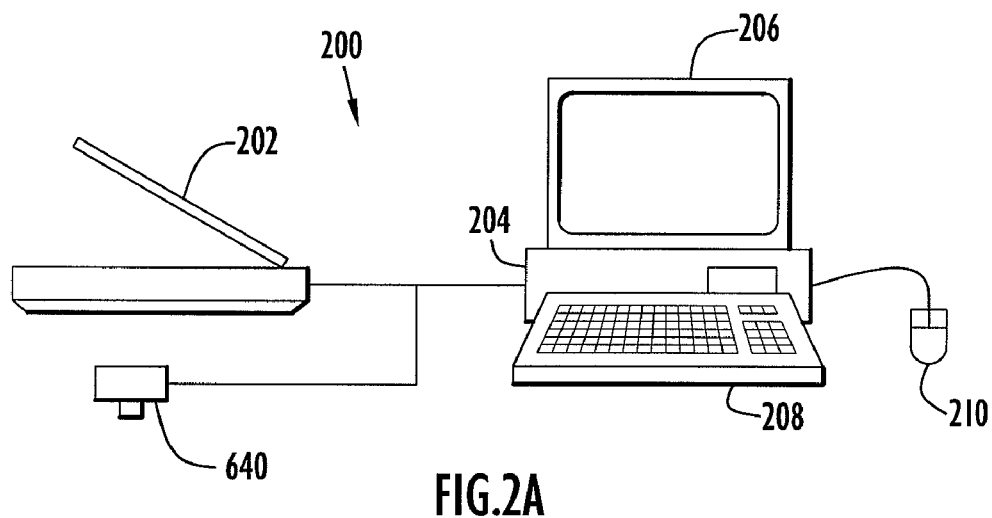
Figure 2B:
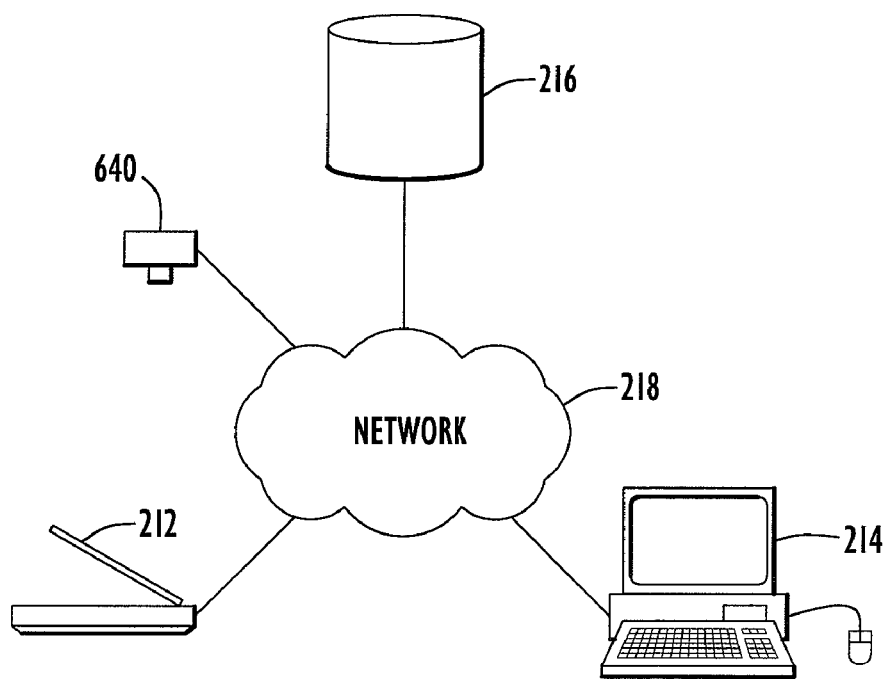

FIG. 2B presents an alternate exemplary embodiment of the present invention in which spray performance analysis system functions are performed in a distributed networked environment. As shown in FIG. 2B, a scanner 212 (or, again, any WC image capture mechanism, e.g., camera 640), computer processing unit 214 and storage device 216 are connected by communication network 218. In such an environment, scanner 212 (or, e.g., a camera) is typically used to generate images of calibration witness cards and/or as-sprayed witness cards and to store the images to networked storage device 216. In this manner, images can be generated, stored and later retrieved by processing unit 214 in order to develop calibration equations and/or generate as-sprayed analysis statistics.

As described in U.S. Pat. No. 7,277,570, paper stock may be used as witness cards. Such paper stock is preferably selected to avoid paper speckle (i.e., single or small clusters of pixels within a witness card image caused by the grain and/or structure of the paper stock) and to avoid paper imperfections (i.e., larger groups of image pixels caused by paper stock local area imperfections or lack of homogeneity in the grain structure of the paper).

Figure 5A:
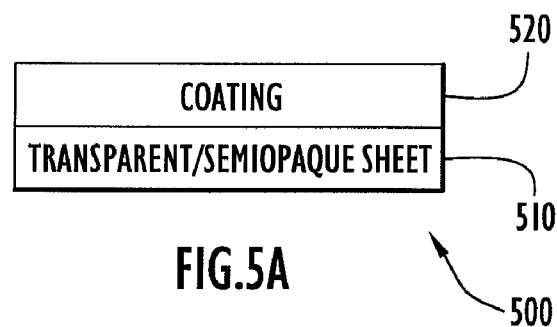

Although paper stock may be used in connection with the instant witness card analysis methodology, it has been determined that other forms of witness cards and related witness card image capturing techniques may be more suitable or desirable in certain situations. Referring now to FIG. 5A, one other type of witness card in accordance with the present invention that may be employed is a semiopaque WC 500.

Figure 5B:
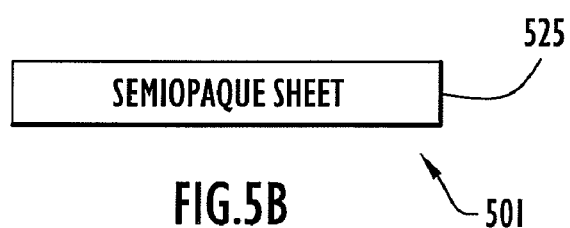

Such a WC 500 may include a transparent or semiopaque sheet or substrate 510 that is covered by a coating 520 that may be designed to chemically react or be altered upon contact/interaction with a sprayed simulant or other substance. Such a WC 500 may be made from, e.g., a material known as flexible TLC plates available from Whatman plc (United Kingdom). These plates are available in 20 cm×20 cm sheets and can be cut with scissors (or with any other appropriate cutting tool) to desired dimensions. A particular variety of these plates suitable for WC analysis in accordance with the present invention is known as TLC PE SIL G/UV, which contains, as a coating, 60 Å of silica gel. FIG. 5B shows an alternative witness card 501 in which a chemical reactant or marker is actually integrally formed or mixed with the material that forms the sheet 525 itself. That is, as a result of the card manufacturing process, the "coating" is indistinguishable from what might be considered a carrier sheet or substrate.

Figure 6:
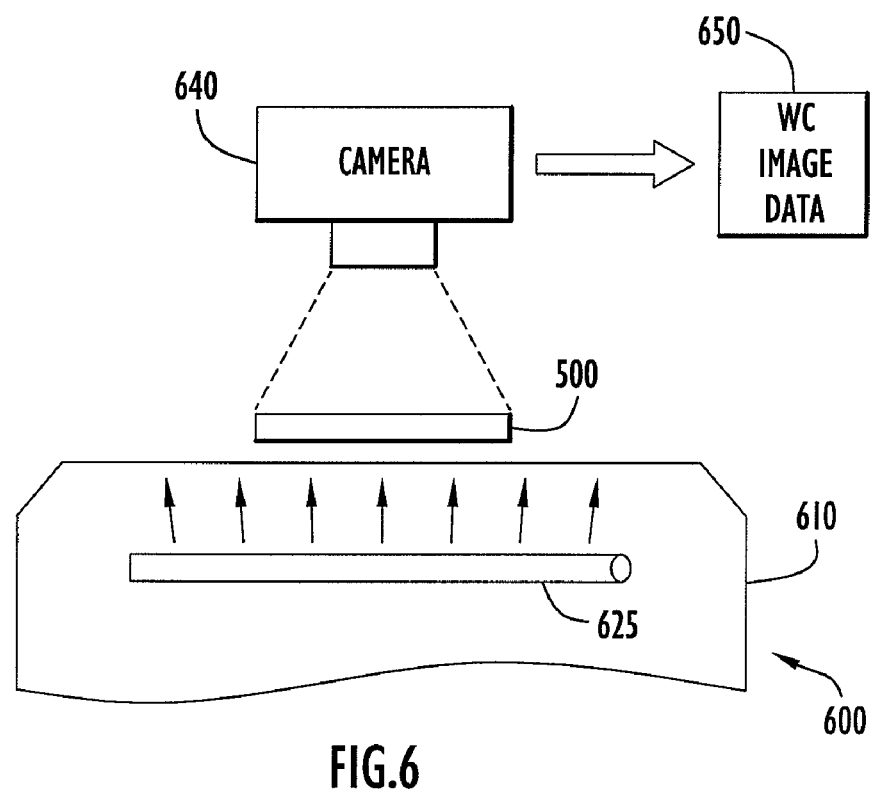

Depending on the type of coating 520 (including, e.g., the coating on the TLC PE SIL G/UV sheets) or chemical reactant/marker, a droplet of simulant (and particularly an un-dyed stimulant) may not be immediately visible to a human eye or electronic imaging device such as a scanner or digital camera. Accordingly, to facilitate detection or viewing of stains on semiopaque WC 500, an image enhancing apparatus 600 may be provided, as shown in FIG. 6. Such an apparatus may comprise a light table 610 having a light source 625 that is preferably capable of emitting light in an evenly distributed manner so as to avoid, to the extent possible, uneven lighting of a WC 500. The light source may comprise any suitable form of illumination at any suitable wavelength and is not restricted to white light or light in the visible waveband. Light table 610 preferably has a semiopaque or semi-transparent platform 630 through which light from light source 625 passes. Platform 630 may comprise glass, crystalline and/or plastic structures that help to evenly distribute light.

In accordance with an embodiment of the instant invention, WC 500 is placed on platform 630 in view of, for example, a camera 640. Camera 640 may be a conventional film camera, but is preferably an electronic digital camera that can quickly generate digital WC image data 650. Light source 625 illuminates WC 500 in such a way as to make the stains or droplets thereon visible to, e.g., camera 640. The resulting captured WC image data 650 is the data that, as shown in FIG. 1, may be supplied to either calibration image analysis unit 104 or witness card image analysis unit 105. Further, it should be appreciated by those skilled in the art that the light table 610 and camera 640 arrangement described herein is merely an example of one approach to practicing the instant invention and that other implementations of a WC image capture unit 102 are possible and still within the scope of the invention.

Figure 3:
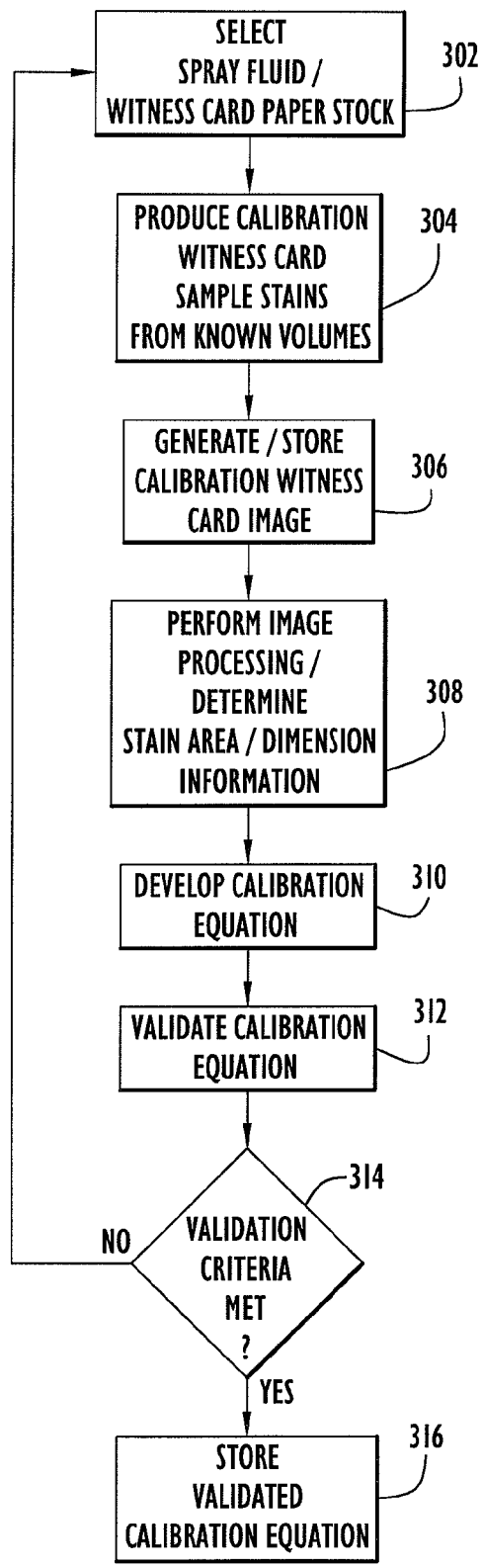

With the WC data 650 in hand, either by way of a scanner or the light table 610 and camera 640 arrangement of FIG. 6, analysis of the witness card data can proceed as explained in detail in U.S. Pat. No. 7,277,570 and as outlined next. FIG. 3 depicts a process flow diagram for the development of calibration equations used to calibrate a spray performance analysis system in accordance with an exemplary embodiment of the present invention. As shown in FIG. 3, a spray fluid and witness card type is selected (e.g., paper stock, transparent/coated/semiopaque) at step 302, and calibration witness card sample stains are produced at step 304, upon the selected WC with known volumes of the selected fluid. Next, at step 306, the calibration witness card is scanned or digitally imaged by WC image capture unit 102 (see FIG. 1) to produce an electronic image containing images of the calibration witness card stains. Image processing of the respective stain images is performed, at step 308, by image analysis unit 104 to determine stain area and/or dimension measurements of the sample stains. Examples of such dimension measurements may include a diameter of an identified stain, a radius of an identified stain, and a circumference of an identified stain. Stain area and/or dimension measurement information and droplet volume information is passed to calibration unit 106 to develop, at step 310, a calibration equation, or set of linear and/or non-linear equations, using conventional techniques capable of approximating droplet volume as a function of droplet stain area and/or dimension measurements. The generated calibration equation is validated, at step 312, by calculating stain volume approximations for each of the calibration droplets based upon the measured calibration stain measurements. If the approximated volumes are determined, at step 314, to be within a predetermined percentage error of the known droplet volumes, the generated calibration equation information is stored, at step 316, for later access by the spray performance analysis system statistics unit 108. If the approximated volumes are determined, at step 314, to not be within the predetermined percentage error of the known droplet volumes, the calibration process described above is iterated or repeated until a set of validated calibration equations is achieved. Still additional detail regarding the calibration process of depicted in FIG. 3 may be found in U.S. Pat. No. 7,277,570.

Figure 4:
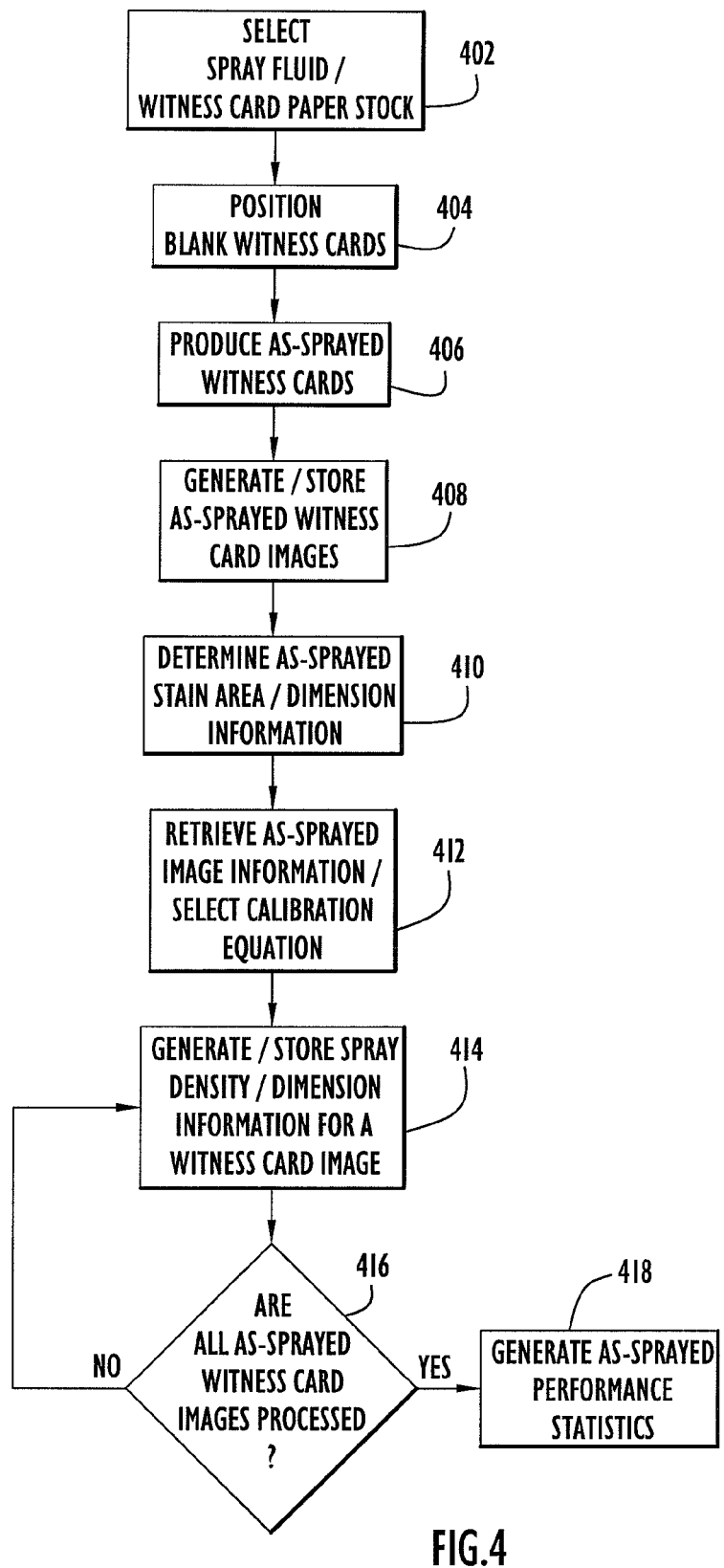

FIG. 4 is a process flow diagram depicting use of the spray performance analysis system of FIG. 1 to generate as-sprayed performance statistics in accordance with an exemplary embodiment of the present invention. As shown in FIG. 4, a spray fluid and witness card type is selected at step 402, witness cards are positioned at step 404 throughout an area to be sprayed, and as-sprayed witness card stains are produced at step 406 as a result of spraying the test area with a spray device in a prescribed manner using the selected fluid or simulant. For example, the manner of spraying is typically representative of a proposed agricultural, military, industrial or other use, as described above.

Next, at step 408, an electronic image of each as-sprayed witness card is produced using WC image capture unit 102 (e.g., scanner or digital camera) and stored. Image processing of the respective stain images is performed, at step 410, by WC image analysis unit 105 to identify stains within the as-sprayed witness card image that exceed a pre-determined threshold and to determine an approximate area and/or dimension of each detected stain. Examples of such dimension measurements may include a diameter of an identified stain, a radius of an identified stain, and a circumference of an identified stain. Preferably, such as-sprayed witness card stain area and/or dimension information is stored in a manner that associates the witness card with a unique test (e.g., a unique test identifier, etc.).

At step, 412, statistics unit 108, retrieves as-sprayed witness card stain area measurement and/or dimension information associated with a common test from storage and further retrieves a set of calibration equations for use in approximating the mass of the droplet that produced each identified as-sprayed witness card stain. Next, at step 414, statistics unit 108 generates and stores spray density and droplet mass data for an as-sprayed witness card associated with the selected test. If the statistics unit 108 determines, at step 416, that additional as-sprayed witness card stain area and/or dimension information remains to be processed, step 414 is repeated, otherwise, statistics unit 108 proceeds to generate, at step 418, statistics data that summarizes as-sprayed performance based upon the spray density and droplet mass data generated, at step 414, for each of the respective as-sprayed witness cards. Additional detail related to steps identified in FIG. 4 may be found in U.S. Pat. No. 7,277,570.

In positioning, at step 404, witness cards within a target spray area, care should be taken to place the witness cards in positions that may capture appropriate spray information. For example, witness cards may be placed at strategically selected and/or evenly spaced locations from a stationary spray distribution point, or a ground zero detonation point, to form one or more representative grids and/or cross-sections of the target area. If the spray device is mobile, witness cards may be placed at strategically selected locations and/or evenly spaced intervals along the spray path. For example, to sample spray performance of a spray device moving along a spray path, a set of witness cards may be positioned along a perpendicular cross-section of the spray path. Such cross-sectional sampling may be established at various points along the spray path to obtain information related to performance of the spray device over time.

In producing as-sprayed witness cards, at step 406, care should be taken to monitor the as-sprayed operational conditions and any deviations from the operational conditions under which the calibration witness card was created should be duly noted. Such notable changes may include, as-sprayed fluid temperature, as sprayed viscosity, color intensity, wind conditions, ambient temperature/humidity, etc. Preferably, the as-sprayed operational conditions can be matched at step 412 with a set of calibration equations based upon calibration witness card data produced under the same operational conditions. This matching may be conveniently done post-spraying as noted above.

The systems and methods described herein may be embodied in other specific forms without departing from the spirit or essential characteristics thereof. The foregoing embodiments are therefore to be considered in all respects illustrative and not meant to be limiting.

What is claimed is:

1. A witness card analysis method, comprising:
    selecting a fluid to be sprayed;
    positioning a witness card in an area to be sprayed;
    spraying the fluid such that drops of the fluid contact the witness card resulting in an as-sprayed witness card with a pattern of stains of the fluid thereon;
    exposing the as-sprayed witness card to a backlight sufficient to make the fixed pattern of stains visible;
    capturing an image of the pattern of stains while the as-sprayed witness card is being exposed to the backlight;
    processing the image of the pattern of stains to determine characteristics of the drops of the fluid on the as-sprayed witness card, wherein processing comprises using a calibration equation to assess characteristics of the pattern of stains on the as-sprayed witness card by comparing characteristics of the stains of the fluid on the as-sprayed witness card with characteristics of stains of the fluid on a calibration witness card, wherein the calibration equation is developed based on respective dimensions of a plurality of stains and known volume of the fluid for each stain on the calibration witness card; and
    generating statistics regarding the as-sprayed witness card using the calibration equation.

2. The method of claim 1, wherein the fluid is a simulant.

3. The method of claim 1, wherein the fluid is un-dyed.

4. The method of claim 1, wherein the witness card is semiopaque.

5. The method of claim 4, wherein the witness card comprises a coating.

6. The method of claim 5, wherein the coating chemically reacts with the fluid in such a way as to retain evidence of the fluid having been deposited on the surface of the witness card.

7. The method of claim 1, further comprising capturing the image of the pattern of stains using a camera.

8. The method of claim 7, wherein the camera is a digital camera.

9. The method of claim 1, wherein the characteristics of the stains include at least one of an area of an identified stain, a diameter of an identified stain, a radius of an identified stain, and a circumference of an identified stain.

10. A method of assessing a spray using image processing techniques to analyze an image of an as-sprayed witness card, the witness card having been sprayed with drops of a fluid, the method comprising:
    preparing a calibration witness card having a plurality of stains, wherein each stain is created with a known volume of a fluid;
    exposing the calibration witness card to a backlight sufficient to make the plurality of stains visible and, at the same time, capturing an image of the plurality of stains thereon;
    developing a calibration equation that is based on respective dimensions of the plurality of stains and known volume of the fluid for each stain;
    obtaining an as-sprayed witness card, wherein the as-sprayed witness card includes a pattern of stains of the fluid;

after the step of exposing the calibration witness card, backlighting the as-sprayed witness card to make the pattern of stains thereon visible and, at the same time, capturing an image of the pattern of stains thereon; and processing the image of the pattern of stains on the as-sprayed witness card using the calibration equation to assess characteristics of the stains of the fluid on the as-sprayed witness card and thereby assess characteristics of the spray.

11. The method of claim 10, wherein the fluid is a simulant.

12. The method of claim 10, wherein the fluid is un-dyed.

13. The method of claim 10, wherein at least one of the calibration witness card or the as-sprayed witness card comprises a substrate having a coating disposed thereon.

14. The method of claim 13, wherein the coating reacts with the fluid.

15. The method of claim 10, further comprising capturing the image of the pattern of stains using a digital camera.

16. The method of claim 10, wherein the characteristics of the stains of the fluid include at least one of: an area of an identified stain, a diameter of an identified stain, a radius of an identified stain, and a circumference of an identified stain 17. A system for assessing a spray, comprising:
a witness card image capture unit including a backlit platform configured to backlight a semiopaque witness card having thereon stains created by drops of a fluid and further configured to capture an electronic image of the stains;
a calibration unit to develop a calibration equation based upon characteristic values determined for stains identified in an electronic image of a calibration witness card, wherein the calibration equation approximates a relationship between the determined calibration witness card stain values and respective volumes of the fluid that created each respective calibration witness card stain;
an image analysis unit to identify a plurality of stains within an electronic image of an as-sprayed witness card and to determine a value for a selected dimensional characteristic for each identified stain based upon image processing of the electronic image of the as-sprayed witness card; and
a statistics unit to determine an as-sprayed drop characteristic based upon a value determined for a stain identified within the image of the as-sprayed witness card and the developed calibration equation.

18. The system of claim 17, wherein the fluid is a simulant.

19. The system of claim 17, wherein the fluid is un-dyed.

20. The system of claim 17, wherein the witness card image capture unit comprises a digital camera.

21. The system of claim 17, wherein the witness card comprises a substrate and a chemical coating disposed on the substrate.

22. The system of claim 21, wherein the chemical coating is selected so as to react with the fluid.

23. The system of claim 17, wherein the dimensional characteristic value determined by the image analysis unit for a stain is at least one of: an area of an identified stain;
a diameter of an identified stain; a radius of an identified stain; and a circumference of an identified stain.

* * * * *